July 28, 1953   J. C. FIRESTINE   2,647,050
PHOTOGRAPHIC EMULSIONS CONTAINING SENSITIZING DYES
Filed Nov. 19, 1949

FIG.1.

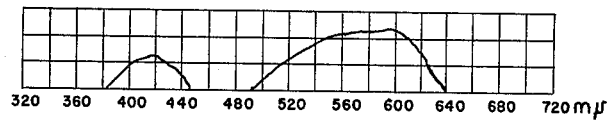

Gelatin Silver Bromochloride Emulsion Containing Dye of Example I.
(3:3'-diethyl-5:5'-dicarboxythiacarbocyanine iodide)

FIG.2.

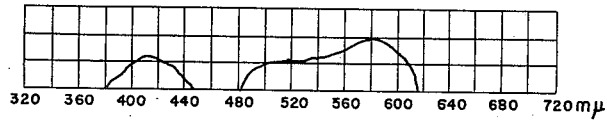

Gelatin Silver Chlorobromide Emulsion Containing Dye of Example II.
(3:3'-diethyl-5:5'-dicarboxy-9-methylthiacarbocyanine iodide)

INVENTOR.

JOHN CHARLES FIRESTINE

BY Lynn Barratt Morris

ATTORNEY

Patented July 28, 1953

2,647,050

UNITED STATES PATENT OFFICE 2,647,050

PHOTOGRAPHIC EMULSIONS CONTAINING SENSITIZING DYES

John Charles Firestine, South River, N. J., assignor to E. I. du Pont de Nemours & Company, Wilmington, Del., a corporation of Delaware Application November 19, 1949, Serial No. 128,495

4 Claims. (Cl. 95—7)

This invention relates to 5-carboxybenzthiazole-carbocyanine dyes and to their preparation and use. More particularly it relates to 5-carboxybenzthiazole-carbocyanine dyes which have an unsubstituted trimethine chain or which have a hydrocarbon group substituted on the central carbon atom of the trimethine chain. The invention also relates to intermediates for the preparation of such cyanine dyes and to photographic silver halide emulsions containing the dyes in sensitizing amounts.

An object of this invention is to provide a new class of benzthiazole carbocyanine dyes. A further object is to provide such dyes which have good sensitizing properties for silver halide emulsions. A still further object is to provide such dyes which do not leave an objectionable residual stain when the dyes are used in photographic silver halide emulsions. Another object of the invention is to provide new and useful colloid silver halide emulsions sensitized with the aforesaid dyes. Yet another object is to provide a practical method for preparing the aforesaid dyes and intermediates therefor. Still other objects will be apparent from the following description of the invention.

It has been found that benzthiazole carbocyanine dyes which contain a carboxylic acid substituent in the 5-position of each benzene nucleus are unique in that they are good sensitizing agents for increasing the optical sensitivity of colloid silver halide emulsions. The 6,6'-carboxybenzthiazole carbocyanine ethiodide on the other hand desensitizes a gelatino silver bromochloride emulsion. The 5-carboxy dyes of this invention, moreover, do not leave an objectionable residual stain in photographic layers after the development and fixing, etc., of the exposed photographic element has been completed. The good sensitizing properties of the carbocyanine dyes of this invention are somewhat surprising in view of the fact that they contain carboxy groups which are substituents of high electronegativity. Cyanine dyes which contain other electronegative groups are not useful as practical photographic sensitizers. For example, dyes containing a —NO₂ group or —SO₂NH₂ group are strong desensitizers and dyes containing an F-group are relatively poor sensitizers.

The novel dyes of this invention may be represented by the following structural formula:

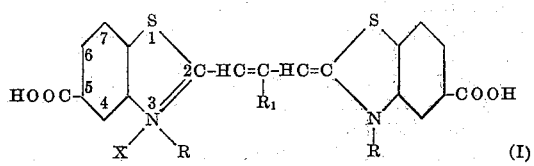

where R is an alkyl radical of 1 to 12 carbon atoms or is a benzyl radical, R₁ is a member taken from the group consisting of hydrogen and a hydrocarbon radical, e. g., methyl, ethyl, propyl, isopropyl, hexyl, dodecyl, phenyl, naphthyl, and benzyl and X is the negative radical of an acid, e. g., halogen such as Cl, Br and I; perchlorate, SCN, p-toluene sulfonate, methyl sulfate-, ethyl sulfate-, etc.

The dyes of formula I can be made from 2-methyl-5-carboxybenthiazole by converting this base into a cycloammonium salt with a quaternizing or salt-forming agent such as an alkyl salt or ester of an alcohol radical with a suitable acid, e. g., an alkyl halide, alkyl nitrate, alkyl perchlorate, alkyl-p-toluene sulfonate, alkyl sulfamate, benzyl halide, alkyl sulfate, etc. The cycloammonium salts of 2-methyl-5-carboxybenzthiazole may be represented by the general formula:

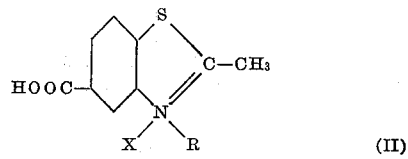

where R has the same significance in Formula I.

The cycloammonium salts of Formula II may be converted into carbocyanine dyes of Formula I by reacting them with an orthoester of a carboxylic acid, e. g., methyl and ethyl orthoformate, orthoacetate, orthopropionate, orthobenzoate, etc. When orthoformate esters are used, R₁ in Formula I is a hydrogen atom. When an orthoester of a saturated aliphatic monocarboxylic acid is used, R₁ is an alkyl and when an orthoester of an aromatic carboxylic acid is used R₁ is an aryl radical, etc.

The salt-forming reaction and cyanine dye condensation reaction may be carried out simultaneously if desired by admixing 2-methyl-5-carboxybenzthiazole in any suitable manner with the alkyl or aralkyl salt and the orthoester of the aliphatic or aromatic carboxylic acid.

The carbocyanine dyes of Formula I are useful photographic sensitizing dyes and may be incorporated with colloid-silver halide emulsions of various types including silver chloride, silver bromide, silver chlorobromide, silver iodobromide, simple and mixed emulsions. Various types of colloids can be used as binding agents for the light-sensitive silver halide grains, e. g., gelatin, albumin, agar agar; hydrophilic cellulose acetate, polyamides, hydrolyzed ethylene/vinyl acetate copolymers; polyvinyl alcohol, etc.

The new carbocyanine dyes can be added to emulsions in various ways. Thus, they may be added in the form of solutions. Suitable solvents are the water-miscible alcohols, e. g., methyl and ethyl alcohol, which may be substantially anhydrous or diluted with water. They can be added to the emulsion during any desired stage of its production in the conventional manners. However, they are preferably added to the finished emulsion before coating. They may be introduced into the emulsion layer by impregnating it with a solution of the dye, e. g., by bathing the finished layer in a bath in which the dye is dissolved. The quantity of sensitizing dye used will, of course, depend on the particular emulsion to which it is added and the particular dye used. The quantities may vary from 5 to 30 or more milligrams per kilogram of fluid emulsion.

The preparation of 2 - methyl - 5 - carboxybenzthiazole will now be described.

2-methyl-5-carboxybenzthiazole

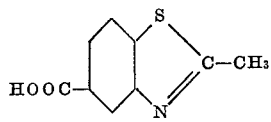

STEP A

In a suitable flask 61.5 grams of 3-nitro-4-chlorobenzoic acid were dissolved in 75 milliliters of ethyl alcohol and heated to reflux. Thirty-six milliliters of 30% NaOH was then added and immediately following solution 72 grams

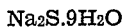

36 milliliters of water, 9.6 grams of sulphur and 24 cc. of alcohol were added. The mixture was refluxed for three hours and then cooled, filtered and diluted with cold water, then acidified with glacial acetic acid. The resulting precipitate was filtered and recrystallized from alcohol and water.

STEP B

Thirty grams of the product from Step A and 200 milliliters of acetic anhydride were heated to reflux and 30 grams of zinc dust were added and the mixture refluxed for one hour. The reaction mixture was cooled, the zinc acetate filtered off and acetic anhydride evaporated to a small amount and then taken up with 800 milliliters of ethyl alcohol and saturated with H₂S. The resulting zinc sulfide was filtered off and the alcohol evaporated. The resulting 2-methyl-5-carboxybenzthiazole having the above formula was recrystallized from hot water and then from a water-alcohol mixture. A yield of 12.3 grams of product was obtained having a melting point 192°–193° C. This dye base was treated with diethyl sulfate to form the quaternary salt having the formula:

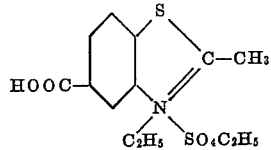

In the accompanying drawing—

Fig. 1 is a graph of a spectrogram of the dye of Example I in a gelatin silver bromochloride emulsion, and Fig. 2 is a graph of a spectrogram of the dye of Example II in a gelatin silver chlorobromide emulsion.

The invention will be further illustrated but is not intended to be limited by the following examples.

Example I

Preparation of a dye having the formula:

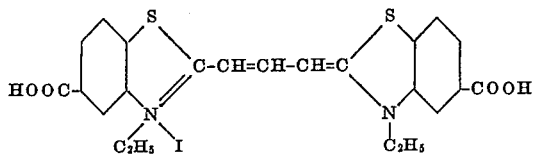

In a suitable flask 1 gram of the base of Formula I above and 1 gram of diethyl sulfate were heated two hours at 140° C. and then dissolved in 12 milliliters of pyridine. Seven milliliters of the resulting solution were refluxed one hour with three milliliters of ethyl orthoformate and then potassium iodide was added. The dye (3:3'-diethyl-5:5'-dicarboxythiacarbocyanine iodide) of the above structural formula was recrystallized twice from alcohol and two grams of purple crystals were obtained which sensitized a gelatino silver bromochloride emulsion out to 6400 Å. with a peak at 6000 Å.

Example II

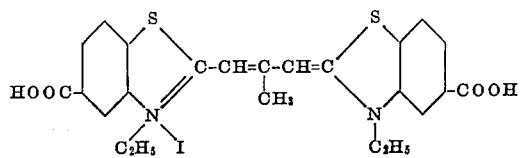

Two grams of 2-methyl-5-carboxybenzthiazole and 2 grams of diethyl sulfate were heated together for three hours at 140° C. Ten milliliters of pyridine and three milliliters of ethyl orthoacetate were then added and the mixture was refluxed for five minutes. The reaction mixture was treated with KI solution and then cooled and the resulting crystals washed with ether. The dye was recrystallized twice from alcohol. A yield of 0.1 gram of reddish brown crystals of the dye (3:3'-diethyl-5:5'-dicarboxy-9-methyl-thiacarbocyanine iodide) having the above structural formula was obtained. This dye conferred an extra range of sensitivity to a lithographic gelatino silver chlorobromide emulsion from 4800 to 6160 Å. with a peak at 5800 Å.

Various other carbocyanine dyes containing different alkyl salt radicals than those described in the foregoing examples can be made in a similar manner by substituting for the diethyl sulfate other alkyl salts such as ethyl p-toluene sulfonate, methyl p-toluene sulfonate, methyl perchlorate, ethyl iodide, methyl chloride, ethyl benzene sulfonate.

The ethylethosulfate salts of the foregoing examples can be converted into other salts by a metathetical reaction, e. g., into the corresponding bromide or iodide by the addition of sodium iodide, potassium bromide, ammonium chloride, potassium thiocyanate, etc.

Similarly in place of the ethyl orthoformate and ethyl orthoacetate of the above examples, there may be substituted other alkyl orthoesters of aliphatic monocarboxylic acids, e. g., methyl orthoformate, ethyl ortho-α-thiophene carboxylate, ethyl orthobutyrate, ethyl orthothioformate, methyl orthovalerate, ethyl orthocaproate, diethyl methyl orthocaproate, ethyl ortho-γ-phenoxy-butyrate, methyl orthophenylacetate, ethyl ortho-para-toluate, ethyl di-n-propyl orthopropionate.

The dyes of this invention, as stated above, have the advantage that they do not leave an objectionable residual stain after the exposure, development and fixing of a photographic element bearing one or more colloid silver halide emulsion layers containing one or more of such dyes has been completed. Another advantage resides in the fact that the dyes have increased solubility in solvents and can be readily introduced into emulsions. Still other advantages will be apparent from the above disclosure.

As many widely different embodiments of this invention can be made without departing from the spirit and scope thereof, it is to be understood that the invention is not to be limited except as defined by the claims.

What is claimed is:

1. A colloid-silver halide emulsion containing a carbocyanine dye of the formula:

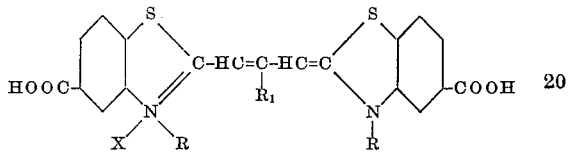

wherein R is a hydrocarbon radical taken from the group consisting of alkyl radicals and benzyl radicals, $R_1$ is a member taken from the class consisting of hydrogen and a hydrocarbon radical and X is a negative radical of an acid.

2. A colloid-silver halide emulsion containing a carbocyanine dye of the formula:

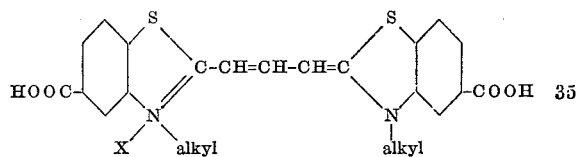

3. A colloid-silver halide emulsion containing a carbocyanine dye of the formula:

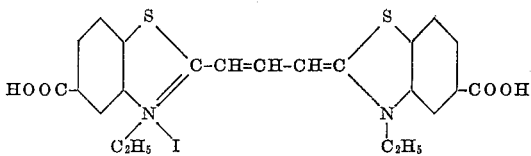

4. A colloid-silver halide emulsion containing a carbocyanine dye of the formula:

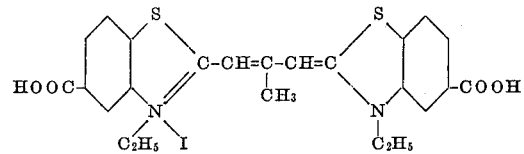

JOHN CHARLES FIRESTINE.

References Cited in the file of this patent

UNITED STATES PATENTS

| Number | Name | Date |
|---|---|---|
| 1,846,302 | Brooker | Feb. 23, 1932 |
| 2,166,736 | White et al. | July 18, 1939 |
| 2,199,542 | Konig | May 7, 1940 |
| 2,263,749 | White | Nov. 25, 1941 |
| 2,322,015 | Hamer et al. | June 15, 1943 |
| 2,323,504 | Wilson | July 6, 1943 |
| 2,340,882 | Kendall | Feb. 8, 1944 |
| 2,342,546 | Kendall | Feb. 22, 1944 |
| 2,353,164 | Kendall et al. | July 11, 1944 |

OTHER REFERENCES

Chemical Abstracts, 16:3101 (Abstract of Brit. Med. Journal, 1922 I 514–515).

Chemical Abstracts, 19:530 (Abstracts of Proc. Roy Soc., London, 96 B 317–333, 1924).

Bloch: The Photographic Journal (Great Britain), January 1928, pages 24 and 30.